United States Patent
Higashidozono

(10) Patent No.: US 12,276,346 B2
(45) Date of Patent: Apr. 15, 2025

(54) FLUID CONTROL VALVE

(71) Applicant: EAGLE INDUSTRY CO., LTD., Tokyo (JP)

(72) Inventor: Hideki Higashidozono, Tokyo (JP)

(73) Assignee: EAGLE INDUSTRY CO., LTD. (JP)

(*) Notice: Subject to any disclaimer, the term of this patent is extended or adjusted under 35 U.S.C. 154(b) by 0 days.

(21) Appl. No.: 18/029,063

(22) PCT Filed: Sep. 24, 2021

(86) PCT No.: PCT/JP2021/034995
§ 371 (c)(1),
(2) Date: Mar. 28, 2023

(87) PCT Pub. No.: WO2022/071092
PCT Pub. Date: Apr. 7, 2022

(65) Prior Publication Data
US 2023/0375098 A1     Nov. 23, 2023

(30) Foreign Application Priority Data
Oct. 1, 2020 (JP) ................. 2020-166935

(51) Int. Cl.
*F16K 17/04* (2006.01)
*F16K 17/10* (2006.01)

(52) U.S. Cl.
CPC ........ *F16K 17/044* (2013.01); *F16K 17/0493* (2013.01); *F16K 17/105* (2013.01)

(58) Field of Classification Search
CPC .. F16K 17/044; F16K 17/105; F16K 17/0493; F16K 31/408
See application file for complete search history.

(56) References Cited

U.S. PATENT DOCUMENTS

| 1,614,002 A | 1/1927 | Horton ................. A62C 35/605 |
| 2,267,515 A | 12/1941 | Wilcox ............... F16K 31/0627 |

(Continued)

FOREIGN PATENT DOCUMENTS

| CN | 110260001 | 9/2019 | ........... F16K 15/016 |
| CN | 111279076 | 6/2020 | ............. F04B 27/18 |

(Continued)

OTHER PUBLICATIONS

International Search Report and Written Opinion and International Preliminary Report on Patentability issued in PCT/JP2021/027769, dated Sep. 7, 2021, 24 pages.

(Continued)

*Primary Examiner* — Kelsey E Cary
(74) *Attorney, Agent, or Firm* — HAYES SOLOWAY P.C.

(57) ABSTRACT

A fluid control valve having extremely high responsiveness not only when a pressure of a working fluid of a first flow path is high but also when the pressure of the working fluid of the first flow path is low includes: a valve seat; a valve body contacting and separating from the valve seat; a first biasing member biasing the valve body in a valve closing direction; and a second biasing member having a spring force lower than that of the first biasing member, wherein the valve body is axially divided into a base portion biased by the first biasing member and an opening and closing portion contacting and separating from the valve seat, and the second biasing member is disposed so that the base portion and the opening and closing portion are axially separable from each other.

11 Claims, 8 Drawing Sheets

(56) References Cited

U.S. PATENT DOCUMENTS

| | | | | |
|---|---|---|---|---|
| 3,360,304 | A | 12/1967 | Adams | B61K 7/12 |
| 3,483,888 | A | 12/1969 | Hugo | F16K 15/046 |
| 4,085,921 | A | 4/1978 | Ueda et al. | F16K 31/06 |
| 4,364,615 | A | 12/1982 | Euler | F16C 27/04 |
| 4,579,145 | A | 4/1986 | Leiber | F16H 61/0251 |
| 4,615,358 | A | 10/1986 | Hammond | F15B 13/0402 |
| 4,895,192 | A | 1/1990 | Mortenson | F01M 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,060,695 | A | 10/1991 | McCabe | G05D 16/2024 |
| 5,217,047 | A | 6/1993 | McCabe | F16H 16/0251 |
| 5,263,694 | A | 11/1993 | Smith | B60G 15/068 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,155,391 | A | 12/2000 | Kashiwagi et al. | F16F 9/348 |
| 6,161,585 | A | 12/2000 | Kolchinsky | F05D 16/2024 |
| 6,361,283 | B1 | 3/2002 | Ota | F04B 27/1084 |
| 6,481,976 | B2 | 11/2002 | Kimura | F04B 27/1804 |
| 7,040,595 | B2 | 5/2006 | Hirota | F16K 31/02 |
| 7,533,687 | B2 | 5/2009 | Uemura | F16K 27/048 |
| 7,726,949 | B2 | 6/2010 | Taguchi | F04B 1/26 |
| 8,021,124 | B2 | 9/2011 | Umemura | F04B 27/1804 |
| 8,079,827 | B2 | 12/2011 | Iwa | F04B 27/1804 |
| 8,225,818 | B1 | 7/2012 | Stephens | F15B 13/0442 |
| 8,651,826 | B2 | 2/2014 | Futakuchi | F04B 27/1804 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16F 1/32 |
| 9,453,518 | B2 | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 11,085,431 | B2 | 8/2021 | Fukudome et al. | F16K 31/06 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0197141 | A1 | 10/2003 | Kajitani | F16L 47/00 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2007/0214814 | A1 | 9/2007 | Umemura et al. | |
| 2007/0264134 | A1 | 11/2007 | Hirota | F04B 27/1084 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa | 137/487.5 |
| 2009/0256091 | A1 | 10/2009 | Nordstrom | F16K 31/0613 |
| 2010/0019406 | A1 | 1/2010 | Shoji et al. | F16K 1/34 |
| 2010/0282991 | A1 | 11/2010 | Okamoto | F16K 31/02 |
| 2011/0041941 | A1 | 2/2011 | Sonsterod | F16K 15/14 |
| 2011/0061749 | A1 | 3/2011 | Okamoto | F16K 31/0655 |
| 2011/0089352 | A1 | 4/2011 | Morgan | F16K 11/0716 |
| 2011/0203888 | A1 | 8/2011 | Sonsterod | F16F 9/32 |
| 2012/0056113 | A1 | 3/2012 | Tano | F04B 27/1804 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0130916 | A1 | 5/2014 | Saeki | F16K 31/0613 |
| 2014/0294632 | A1 | 10/2014 | Kondo et al. | 417/434 |
| 2014/0369862 | A1 | 12/2014 | Ota et al. | F04B 27/1804 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1 | 12/2015 | Higashidozono | 137/624.27 |
| 2016/0053755 | A1 | 2/2016 | Taguchi | F04B 49/22 |
| 2016/0290326 | A1 | 10/2016 | Sugamura | F04B 27/1804 |
| 2017/0284562 | A1 | 10/2017 | Hayama | F16K 41/00 |
| 2018/0149395 | A1 | 5/2018 | Takada et al. | F25B 41/06 |
| 2018/0156345 | A1 | 6/2018 | Kanda | F15B 13/0431 |
| 2018/0187793 | A1 | 7/2018 | Futakuchi | F04B 39/08 |
| 2018/0291888 | A1 | 10/2018 | Tonegawa et al. | F04B 49/22 |
| 2019/0162175 | A1 | 5/2019 | Higashidozono | F04B 27/18 |
| 2020/0032781 | A1 | 1/2020 | Higashidozono | F16K 31/0624 |
| 2020/0088178 | A1 | 3/2020 | Fukudome et al. | F16K 31/06 |
| 2020/0309105 | A1 | 10/2020 | Hayama et al. | F04B 27/18 |
| 2020/0318624 | A1 | 10/2020 | Hayama | F04B 27/18 |
| 2020/0325881 | A1 | 10/2020 | Hayama et al. | F04B 27/18 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |
| 2021/0404570 | A1 | 12/2021 | Hayama et al. | F16K 17/04 |

FOREIGN PATENT DOCUMENTS

| | | | | |
|---|---|---|---|---|
| CN | 111316028 | | 6/2020 | F16K 31/06 |
| CN | 111417780 | | 7/2020 | F04B 27/18 |
| EP | 2594794 | | 5/2013 | F04B 27/18 |
| EP | 3296599 | | 3/2018 | F16K 1/34 |
| EP | 3366957 | | 8/2018 | F16K 1/34 |
| EP | 3726054 | | 10/2020 | F04B 27/18 |
| JP | 5682358 | | 7/1981 | G03B 15/00 |
| JP | 5740945 | | 8/1982 | B21B 39/14 |
| JP | 4106576 | | 9/1992 | F16K 31/06 |
| JP | 5346276 | | 12/1993 | F25B 41/96 |
| JP | 626454 | | 2/1994 | F04B 27/08 |
| JP | H0711313 | | 2/1995 | F16K 1/34 |
| JP | H8159320 | | 6/1996 | F16K 31/04 |
| JP | H10220926 | | 8/1998 | F25B 41/06 |
| JP | 11287281 | | 10/1999 | F16F 9/348 |
| JP | 2000304152 | | 11/2000 | F16D 48/02 |
| JP | 2001012534 | | 1/2001 | F16F 9/46 |
| JP | 2001153495 | | 6/2001 | F16K 31/06 |
| JP | 2001153498 | | 6/2001 | F16K 31/06 |
| JP | 2001165055 | | 6/2001 | F04B 27/14 |
| JP | 2002216803 | | 8/2002 | H01M 8/02 |
| JP | 2003004160 | | 1/2003 | F16K 31/04 |
| JP | 2003301772 | | 10/2003 | |
| JP | 2003314745 | | 11/2003 | F16K 51/02 |
| JP | 2004003468 | | 1/2004 | F04B 27/14 |
| JP | 2004101163 | | 4/2004 | F25B 41/06 |
| JP | 2005307817 | | 11/2005 | F04B 27/14 |
| JP | 2005351605 | | 12/2005 | F16K 1/38 |
| JP | 2006153204 | | 6/2006 | F16K 31/04 |
| JP | 2007247512 | | 9/2007 | F04B 27/14 |
| JP | 2008157031 | | 7/2008 | F04B 27/14 |
| JP | 2008190574 | | 8/2008 | F16K 31/06 |
| JP | 2009030752 | | 2/2009 | F16K 31/06 |
| JP | 2009115204 | | 5/2009 | F16K 31/04 |
| JP | 2009221965 | | 10/2009 | F04B 27/14 |
| JP | 2009275550 | | 11/2009 | F04B 49/00 |
| JP | 2010019406 | | 1/2010 | F16K 31/04 |
| JP | 2010270900 | | 12/2010 | F16K 1/00 |
| JP | 2011501798 | | 1/2011 | F16K 15/14 |
| JP | 2011525962 | | 9/2011 | F16F 9/32 |
| JP | 4822735 | | 11/2011 | A43B 23/24 |
| JP | 2012144986 | | 8/2012 | F04B 27/14 |
| JP | 2012211579 | | 11/2012 | F04B 27/14 |
| JP | 2013024135 | | 2/2013 | F04B 27/14 |
| JP | 5167121 | | 3/2013 | F04B 27/14 |
| JP | 2013100915 | | 5/2013 | F15K 31/06 |
| JP | 2014080927 | | 5/2014 | F04B 27/16 |
| JP | 2014092207 | | 5/2014 | F16K 31/06 |
| JP | 2014095463 | | 5/2014 | F16K 31/06 |
| JP | 2014194180 | | 10/2014 | F04B 27/14 |

(56) References Cited

FOREIGN PATENT DOCUMENTS

| | | | |
|---|---|---|---|
| JP | 2015075054 | 4/2015 | ............. F04B 27/14 |
| JP | 20151168 | 5/2015 | ............. F04B 27/14 |
| JP | 2015137546 | 7/2015 | ............. F04B 27/14 |
| JP | 2015152069 | 8/2015 | ............... F16K 1/36 |
| JP | 2015178795 | 10/2015 | ............. F04B 27/14 |
| JP | 5983539 | 8/2016 | ............. F04B 27/18 |
| JP | 2016196825 | 11/2016 | ............. F04B 27/18 |
| JP | 2016196876 | 11/2016 | ............. F04B 27/18 |
| JP | 2016205404 | 12/2016 | ............. F04B 27/18 |
| JP | 6135521 | 5/2017 | ............. F04B 27/18 |
| JP | 2017089832 | 5/2017 | ............. F16K 31/06 |
| JP | 2017180525 | 10/2017 | ............. F16K 31/04 |
| JP | 2018015739 | 2/2018 | ............... C02F 1/46 |
| JP | 2018035840 | 5/2018 | |
| JP | 2018115684 | 7/2018 | ............. B60G 17/08 |
| JP | 2018135954 | 8/2018 | ............. F16K 31/06 |
| JP | 2018179087 | 11/2018 | ............. F16K 31/06 |
| JP | 2019131725 | 8/2019 | |
| JP | 2019138473 | 8/2019 | ............... F16K 1/36 |
| JP | 2019167982 | 10/2019 | ............... F16K 1/38 |
| JP | 2020008038 | 1/2020 | ............... F16K 1/36 |
| JP | 2020041606 | 3/2020 | ............... F16K 1/44 |
| WO | WO2006090760 | 8/2006 | ............. F04B 27/18 |
| WO | WO2007119380 | 10/2007 | ............. F04B 27/14 |
| WO | WO2009025298 | 2/2009 | ............. F16K 31/06 |
| WO | WO2011114841 | 9/2011 | ............. F04B 27/14 |
| WO | WO2011132438 | 10/2011 | ............. F16K 31/06 |
| WO | WO2012077439 | 6/2012 | ............. F04B 27/14 |
| WO | WO2014098727 | 6/2014 | ............... F16K 1/36 |
| WO | WO2014119594 | 8/2014 | ............. F04B 27/14 |
| WO | WO2014148367 | 9/2014 | ............. F16K 31/06 |
| WO | WO2016194388 | 12/2016 | ............... F16K 1/00 |
| WO | WO2018124156 | 7/2018 | ............. F16K 31/06 |
| WO | WO2019131482 | 7/2019 | ............. F04B 27/18 |
| WO | WO2020110925 | 11/2019 | ............. F04B 27/18 |

OTHER PUBLICATIONS

International Search Report and Written Opinion and International Preliminary Report on Patentability issued in PCT/JP2021/027762, dated Oct. 5, 2021, 20 pages.

International Search Report and Written Opinion and International Preliminary Report on Patentability issued in PCT/JP2021/027766, dated Sep. 7, 2021, 24 pages.

International Search Report and Written Opinion and International Preliminary Report on Patentability issued in PCT/JP2021/027770, dated Oct. 5, 2021, 20 pages.

International Search Report and Written Opinion and International Preliminary Report on Patentability issued in PCT/JP2021/027772, dated Sep. 21, 2021, 24 pages.

International Search Report and Written Opinion and International Preliminary Report on Patentability issued in PCT/JP2021/027767, dated Sep. 7, 2021, 22 pages.

International Search Report and Written Opinion and International Preliminary Report on Patentability issued in PCT/JP2021/030007, dated Nov. 2, 2021, 18 pages.

International Search Report and Written Opinion and International Preliminary Report on Patentability issued in PCT/JP2021/034996, dated Dec. 12, 2021, 18 pages.

International Search Report and Written Opinion and International Preliminary Report on Patentability issued in PCT/JP2021/034990, dated Oct. 19, 2021, 18 pages.

International Search Report and Written Opinion and International Preliminary Report on Patentability issued in PCT/JP2021/034995, dated Dec. 14, 2021, 16 pages.

International Search Report and Written Opinion and International Preliminary Report on Patentability issued in PCT/JP2022/033101, dated Sep. 27, 2022, 25 pages.

International Search Report and Written Opinion and International Preliminary Report on Patentability issued in PCT/JP2022/021401, dated Jun. 29, 2022, 17 pages.

FLUID CONTROL VALVE

TECHNICAL FIELD

The present invention relates to a valve which controls a working fluid and, for example, a fluid control valve having a relief function or the like capable of discharging a working fluid.

BACKGROUND ART

A valve used to control a working fluid in various industrial fields includes a valve body contacting and separating from a valve seat and can control the flow rate or pressure of the working fluid by adjusting a valve opening degree. Such a fluid control valve is largely classified into a valve (for example, a pressure reducing valve or the like) that detects a fluid pressure on a secondary side, adjusts a valve opening, restricts the amount of fluid introduced from a primary side, and controls the flow rate, pressure, or the like of the working fluid on the primary side and a valve that controls the flow rate and pressure of the working fluid by detecting the fluid pressure of the working fluid and discharging the working fluid to the outside when the fluid pressure exceeds a predetermined level, that is, a valve with a so-called relief function. In the fluid control valve with the relief function, a relief function with extremely high responsiveness may be required depending on the used device.

Shock absorbers and the like are examples of the devices using a fluid control valve with a highly responsive relief function. In order to control the damping force, a fluid control valve with a relief function in which a valve body is separated from a valve seat depending on a fluid pressure of a piston chamber is fluidly connected to the piston chamber in which a piston of the shock absorber is disposed and a reservoir chamber which is provided to be able to communicate with the piston chamber.

As an example of the fluid control valve with the relief function used in the shock absorber, patent Citation 1 or the like can be exemplified. The fluid control valve illustrated therein includes a valve housing which has a first flow path communicating with a piston chamber of a shock absorber and a second flow path communicating with a reservoir chamber, a valve body which is provided between the first flow path and the second flow path, a valve seat, a first biasing means biasing the valve body in a valve closing direction, and a second biasing means having a spring force smaller than that of the first biasing means and the first biasing means and the second biasing means are arranged in series. The first biasing means and the second biasing means press the valve body against the valve seat and the valve closed state can be maintained.

This fluid control valve can discharge the working fluid by compressing the second biasing means and the first biasing means at the same time when the pressure of the working fluid flowing into the first flow path is high and can compress the second biasing means first when the pressure of the working fluid of the first flow path is low. That is, when the pressure of the working fluid of the first flow path is equal to or higher than a low level and lower than a high level, the working fluid can be discharged without requiring the movement against the biasing force of the first biasing means.

CITATION LIST

Patent Literature

Patent Citation 1: JP 2011-501798 A (Pages 6 and 7, FIG. 2)

SUMMARY OF INVENTION

Technical Problem

In this way, in the fluid control valve of patent Citation 1, when the pressure of the working fluid of the first flow path is low, the working fluid can be discharged without requiring the movement against the biasing force of the first biasing means. However, the relief function has not been highly satisfactory from the viewpoint of responsiveness due to the mass, fluid resistance, and the like of the moving valve body.

The present invention has been made in consideration of such problems and an object thereof is to provide a fluid control valve having extremely high responsiveness not only when a pressure of a working fluid of a first flow path is high but also when the pressure of the working fluid of the first flow path is low.

Solution to Problem

In order to solve the foregoing problems, a fluid control valve according to the present invention includes: a valve seat; a valve body configured to contact and separate from the valve seat; a first biasing member configured to bias the valve body in a valve closing direction; and a second biasing member having a spring force lower than that of the first biasing member and configured to bias the valve body in the valve closing direction, the valve seat and the valve body being provided between a first flow path and a second flow path and the fluid control valve being configured to discharge a working fluid of the first flow path is discharged to the second flow path depending on a pressure of the working fluid of the first flow path, and wherein the valve body is axially divided into a base portion biased by the first biasing member and an opening and closing portion configured to contact and separate from the valve seat, and the second biasing member is disposed so that the base portion and the opening and closing portion are axially separable from each other. According to the aforesaid feature of the present invention, when the pressure of the working fluid of the first flow path becomes high, the opening and closing portion moves against the second biasing member having a low spring force, prior to the base portion and the first biasing member. Therefore, when the pressure of the working fluid of the first flow path is low, the opening and closing portion can move without accompanying the movement of the base portion or the first biasing member. Accordingly, the highly responsive fluid control valve can be provided. Further, when the pressure of the working fluid of the first flow path is high, the base portion is further pressed by the second biasing member and the opening and closing portion from a state in which the opening and closing portion moves against the second biasing member and the base portion, the second biasing member, and the opening and closing portion move against the first biasing member. Accordingly, the highly responsive fluid control valve can be provided.

It may be preferable that the base portion is axially slidable with respect to a valve housing in which the base portion is housed. According to this preferable configuration, since the base portion is guided by the valve housing, the operation of the valve body can be stabilized.

It may be preferable that the opening and closing portion is axially slidable with respect to the base portion. According to this preferable configuration, since the opening and closing portion is moved while being guided relatively coaxially with the base portion, the valve opening degree can be highly accurately controlled.

It may be preferable that a space inside a valve housing in which the base portion and the first biasing member are housed is a pilot control chamber, and the opening and closing portion is provided with a communication path which communicates the first flow path with the pilot control chamber. According to this preferable configuration, since the pressure of the working fluid of the pilot control chamber can be changed by changing the flow rate of the working fluid flowing through the pilot control chamber, the fluid control characteristics can be changed while maintaining high responsiveness.

It may be preferable that the second biasing member is disposed between the base portion and the opening and closing portion and outside the pilot control chamber. According to this preferable configuration, since the second biasing member is not exposed to the pilot control chamber through which the working fluid passes, deterioration of the second biasing member or contamination caused by the second biasing member can be prevented.

DESCRIPTION OF EMBODIMENTS

Modes for carrying out a fluid control valve according to the present invention will be described below with reference to embodiments.

First Embodiment

A fluid control valve according to a first embodiment of the present invention will be described with reference to FIGS. 1 to 7. Additionally, the first embodiment will be described by exemplifying the fluid control valve used in a shock absorber, but can also be applied to other uses.

Hereinafter, the top and bottom of the fluid control valve as viewed from the front in FIG. 1 will be described as the top and bottom of the fluid control valve. Specifically, a description will be made such that the lower side of the paper where a main valve 60 is disposed is the lower side of the fluid control valve and the upper side of the paper where a solenoid 80 is disposed as a drive source is the upper side of the fluid control valve.

Figure 1:
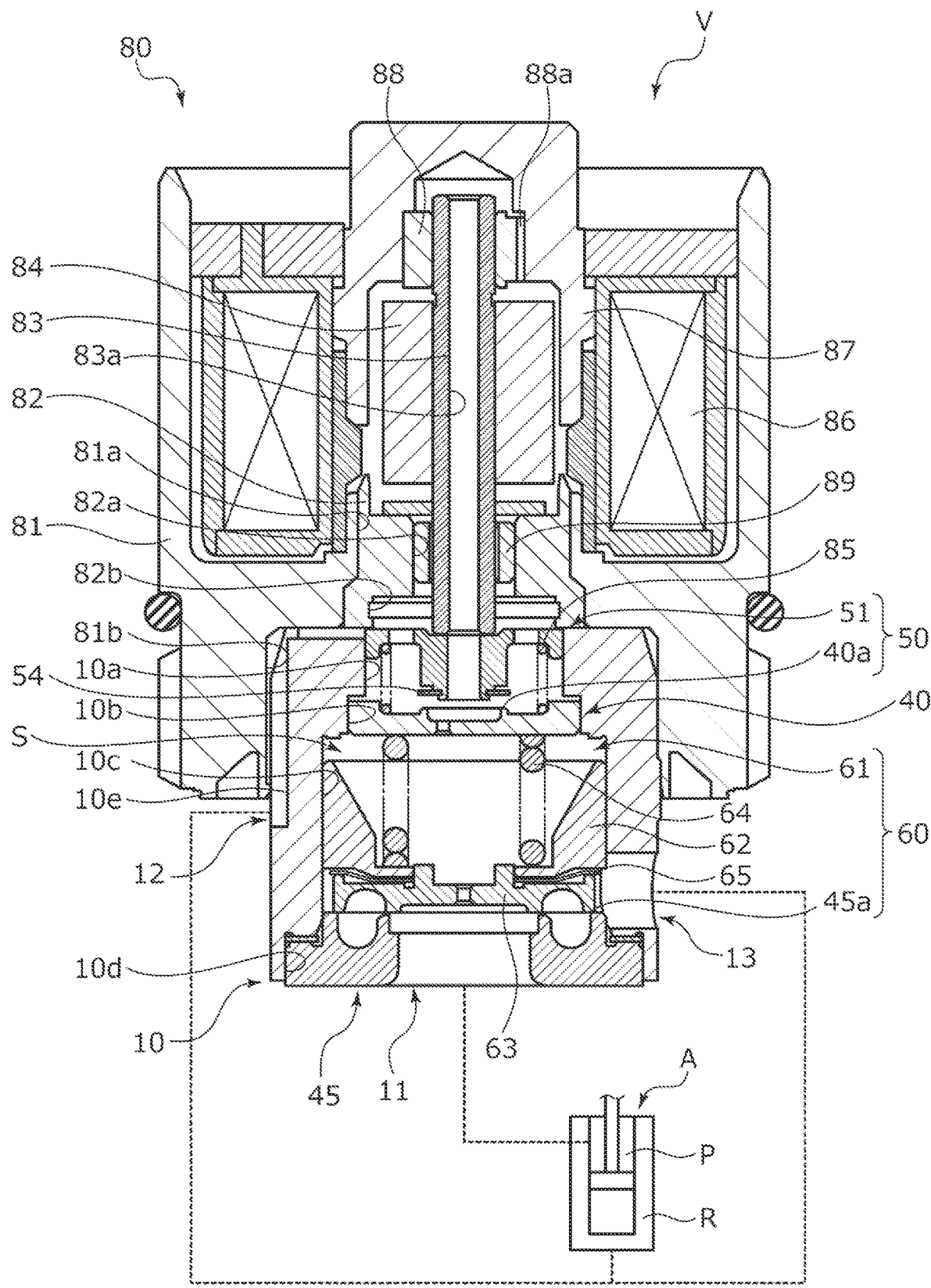
FIG. 1 is a cross-sectional view illustrating a fluid control valve according to a first embodiment of the present invention.

Referring to FIG. 1, a fluid control valve V according to the first embodiment of the present invention is fluidly connected to an absorber piston chamber P and a reservoir chamber R of a shock absorber A.

When the absorber piston moves in the axial direction so that a pressure of a working fluid of a first flow path 11 becomes high, the fluid control valve V opens a main valve 60 so that the working fluid flows out from a second flow path 13 to the reservoir chamber R. Accordingly, the fluid control valve V controls the flow rate of the working fluid flowing from the absorber piston chamber P toward the reservoir chamber R.

Further, in the fluid control valve V, the fluid control characteristic of the main valve 60 is adjusted by a pilot valve 50.

Thus, the fluid control valve V controls the damping force of the shock absorber A.

Next, the structure of the fluid control valve V will be described. As illustrated in FIG. 1, the fluid control valve V mainly includes a valve housing 10, a pilot valve 50, a main valve 60, and a solenoid 80.

Among these, the pilot valve 50 is disposed at the upper end portion inside the valve housing 10. Further, the main valve 60 is disposed below the pilot valve 50 inside the valve housing 10.

The pilot valve 50 includes a pilot valve body 51 and a pilot valve seat 40*a*. The pilot valve 50 is opened and closed in such a manner that a sealing body 54 constituting the pilot valve body 51 contacts and separates from the pilot valve seat 40*a*.

The main valve 60 includes a main valve body 61 which is a valve body and a main valve seat 45*a* which is a valve seat. The main valve 60 is opened and closed in such a manner that an opening and closing portion 63 constituting the main valve body 61 contacts and separates from the main valve seat 45*a*.

First, the solenoid 80 will be described. The solenoid 80 is connected to the valve housing 10 and applies a driving force to the pilot valve body 51.

As illustrated in FIG. 1, the solenoid 80 mainly includes a casing 81, a center post 82, a rod 83, a movable iron core 84, a coil spring 85, a coil 86, a sleeve 87, and bearings 88 and 89.

The casing 81 includes a stepped cylindrical main body portion 81*a* into which the center post 82 is fitted and fixed from the axially lower side.

Further, the casing 81 is provided with an opening portion 81*b* which is continuous to the lower end of the main body portion 81*a* and is opened downward.

The center post 82 is formed in a stepped cylindrical shape from a rigid body made of a magnetic material such as iron or silicon steel.

The center post 82 includes a cylindrical main body portion 82*a* which extends in the axial direction.

Further, the center post 82 is provided with an opening portion 82*b* which is continuous to the lower end of the main body portion 82*a* and is opened to the lower side of the center post 82.

The rod 83 is formed in a cylindrical shape. The rod 83 is inserted through the center post 82 and is disposed to be movable in a reciprocating manner in the axial direction.

Further, the rod 83 is fitted and fixed to the movable iron core 84. Accordingly, when the solenoid 80 is energized, the rod 83 is moved while following the movable iron core 84 moving in the valve closing direction. Accordingly, the rod 83 moves the pilot valve body 51 in the valve closing direction, that is, toward the axially lower side.

Further, the upper end portion of the rod 83 is inserted through the bearing 88 and the lower end portion thereof is inserted through the bearing 89. By these bearings 88 and 89, the movement of the rod 83 in the axial direction is guided. Therefore, the rod 83 is less likely to tilt in the radial direction when moving in the axial direction.

Further, the rod 83 is provided with a communication path 83a penetrating in the axial direction.

The bearing 88 is provided with a communication groove 88a which extends in the axial direction. Accordingly, the influence of the working fluid during the movement of the rod 83 and the movable iron core 84 is reduced.

The coil spring 85 is disposed between the pilot valve seat member 40 and the pilot valve body 51.

The coil spring 85 biases the pilot valve body 51 in the valve opening direction of the pilot valve 50, that is, toward the axially upper side.

The coil 86 is an excitation coil wound around the center post 82 through a bobbin.

The sleeve 87 is formed in a bottomed cylindrical shape. Further, the bearings 88 and 89 guiding the movement of the rod 83 are fitted and fixed to the sleeve 87.

Next, the configuration on the side of the valve housing 10 will be described. The components on the side of the valve housing 10 are the valve housing 10, the pilot valve 50, and the main valve 60.

As illustrated in FIG. 1, the valve housing 10 is formed in a stepped cylindrical shape from a metal material or a resin material.

A cylindrical portion 10a, a small-diameter bottomed cylindrical portion 10b, a medium-diameter bottomed cylindrical portion 10c, and a large-diameter bottomed cylindrical portion 10d are formed in the valve housing 10 in order from the axially upper side.

The pilot valve body 51 is inserted into the cylindrical portion 10a from the axially upper side.

Figure 2:
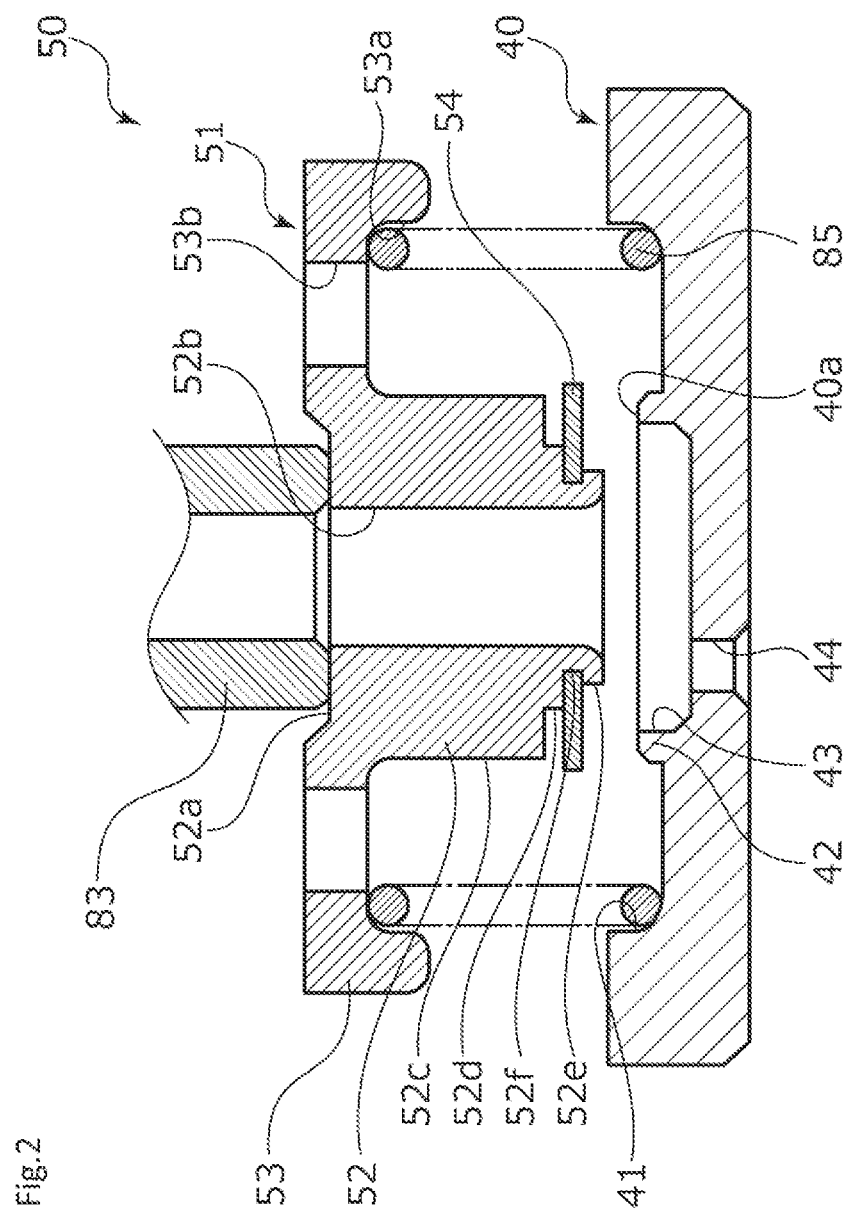
FIG. 2 is a cross-sectional view illustrating a state in which a pilot valve is opened in the fluid control valve in the first embodiment.

As illustrated in FIG. 2, the pilot valve body 51 is formed in a T shape in a cross-sectional view. Specifically, the pilot valve body 51 includes a cylindrical portion 52, a flange portion 53, and a sealing body 54.

The upper end portion of the cylindrical portion 52 is provided with a concave portion 52a which is recessed toward the axially lower side. The lower end portion of the rod 83 comes into contact with the bottom surface of the concave portion 52a. Accordingly, the pilot valve body 51 which receives the biasing force of the coil spring 85 comes into press-contact with the rod 83.

A communication path 52b which penetrates in the axial direction is formed on the inner radial side of the concave portion 52a.

Further, the cylindrical portion 52 has a stepped cylindrical shape which extends in the axial direction. Specifically, a large diameter portion 52c, a medium diameter portion 52d, and a small diameter portion 52e are formed in the cylindrical portion 52 in order from the axially upper side.

The flange portion 53 which extends in the outer radial direction is continuous to the upper end of the large diameter portion 52c. Further, the medium diameter portion 52d having a diameter smaller than that of the large diameter portion 52c is continuous to the lower end of the large diameter portion 52c.

The flange portion 53 has a disk shape which extends in the outer radial direction from the upper end portion of the cylindrical portion 52.

An annular concave portion 53a which is recessed toward the axially upper side is formed at the lower end portion of the flange portion 53.

The annular concave portion 53a is formed to have substantially the same outer radial as the outer radial of an annular concave portion 41 of the pilot valve seat member 40 to be described later. These outer radials are formed slightly larger than the outer radial of the coil spring 85.

The coil spring 85 is disposed on the annular concave portion 53a and the annular concave portion 41 of the pilot valve seat member 40. Therefore, the coil spring 85 is guided by the outer peripheral surfaces of the annular concave portion 41 of the pilot valve seat member 40 and the annular concave portion 53a when compressed in the axial direction to prevent the coil spring 85 from being twisted or bent.

Further, the flange portion 53 is provided with a communication path 53b which penetrates in the axial direction. The communication path 53b communicates the cylindrical portion 10a of the valve housing 10 with the opening portion 82b (see FIG. 1) of the center post 82.

Further, the outer peripheral surface of the flange portion 53 is formed to be movable while sliding on the inner peripheral surface of the cylindrical portion 10a of the valve housing 10. Accordingly, the cylindrical portion 10a can guide the movement of the pilot valve body 51.

The small diameter portion 52e having a diameter smaller than that of the medium diameter portion 52d is continuous to the lower end of the medium diameter portion 52d.

An annular groove 52f which is recessed toward the inner radial side is formed in the small diameter portion 52e to be continuous to the lower end surface of the medium diameter portion 52d. The inner radial side end portion of the disk-shaped sealing body 54 is fitted and fixed to the annular groove 52f. That is, the sealing body 54 is cantilevered by the annular groove 52f and protrudes in the outer radial direction from the annular groove 52f.

Figure 3:
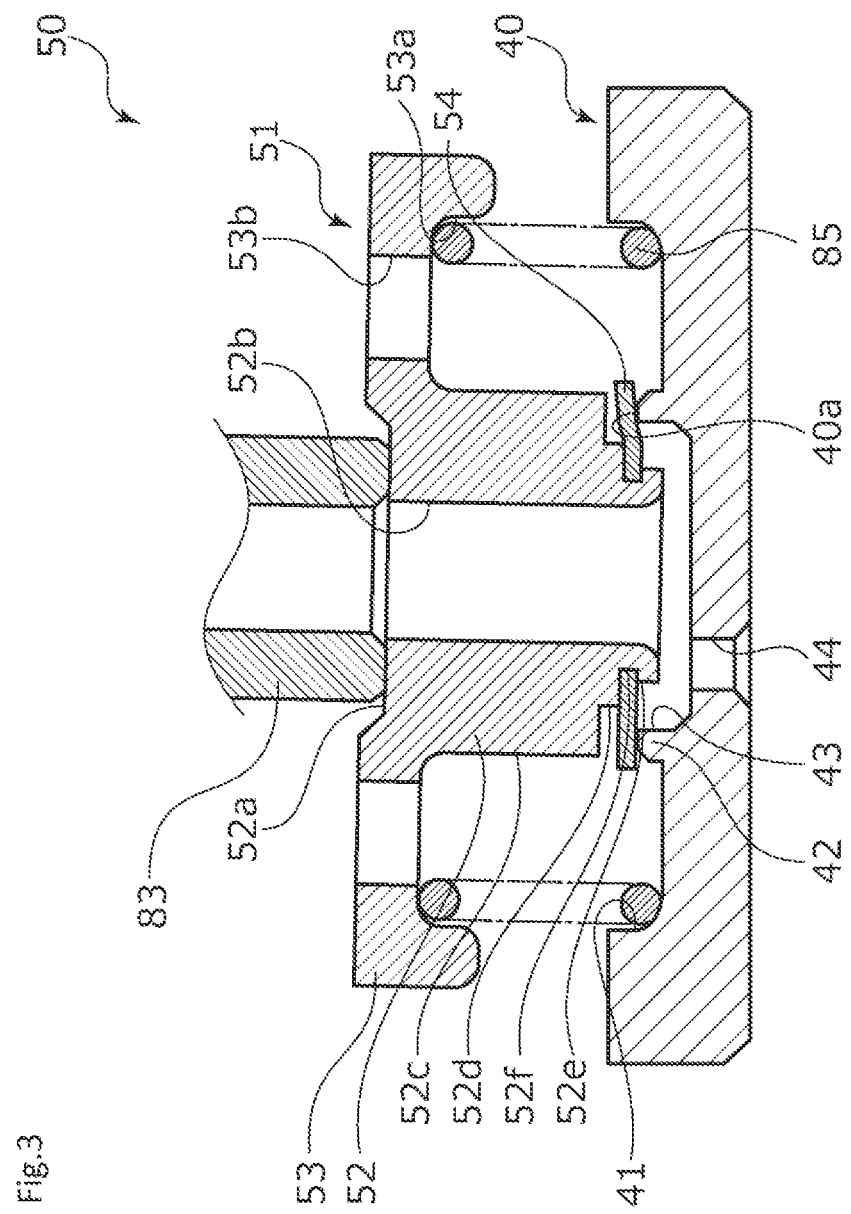
FIG. 3 is a cross-sectional view illustrating a state in which the pilot valve is closed in the fluid control valve in the first embodiment.

The sealing body 54 is formed of a metal material and is elastically deformable in the axial direction (see FIG. 3). Needless to say, the material forming the sealing body 54 is not limited to metal.

The sealing body 54 is seated on or separated from the pilot valve seat 40a.

Returning to the configuration of the valve housing 10, the small-diameter bottomed cylindrical portion 10b is continuous to the cylindrical portion 10a and is recessed toward the axially upper side while the inner side of the cylindrical portion 10a is enlarged in diameter.

The pilot valve seat member 40 that is press-inserted from the axially lower side is integrally fixed to the small-diameter bottomed cylindrical portion 10b in a substantially sealed state.

As illustrated in FIG. 2, the pilot valve seat member 40 is formed in a circular plate shape from a metal material or a resin material. The annular concave portion 41 which is recessed toward the axially lower side is formed in the upper end portion of the pilot valve seat member 40.

Further, an annular convex portion 42 which protrudes toward the axially upper side on the inner radial side of the annular concave portion 41 is formed in the upper end portion of the pilot valve seat member 40. The upper end portion of the annular convex portion 42 is the pilot valve seat 40a.

Further, a circular concave portion 43 which is recessed toward the axially lower side in relation to the bottom surface of the annular concave portion 41 on the inner radial side of the annular convex portion 42 is formed at the upper end portion of the pilot valve seat member 40. Further, a communication path 44 which penetrates in the axial direction is formed on the bottom portion of the circular concave portion 43.

Returning to the configuration of the valve housing 10, the medium-diameter bottomed cylindrical portion 10c is continuous to the small-diameter bottomed cylindrical portion 10b and is recessed toward the axially upper side while the inner side of the small-diameter bottomed cylindrical portion 10b is enlarged in diameter.

The main valve body 61 and a coil spring 64 are inserted into the medium-diameter bottomed cylindrical portion 10c from the axially lower side. Further, the upper end portion of the main valve seat member 45 press-inserted from the axially lower side is integrally fixed to the medium-diameter bottomed cylindrical portion 10c in a substantially sealed state.

In addition, as illustrated in FIG. 1, a pilot control chamber S is formed in a space inside the small-diameter bottomed cylindrical portion 10b and the medium-diameter bottomed cylindrical portion 10c of the valve housing 10. The pilot control chamber S is defined by the small-diameter bottomed cylindrical portion 10b, the medium-diameter bottomed cylindrical portion 10c, the pilot valve seat member 40, the pilot valve body 51, and the main valve body 61.

That is, the pilot control chamber S includes the circular concave portion 43 and the communication path 44 of the pilot valve seat member 40 and is the upstream flow path of the pilot valve body 51, that is, the upstream flow path of the pilot valve 50 (see FIG. 2).

Figure 4:
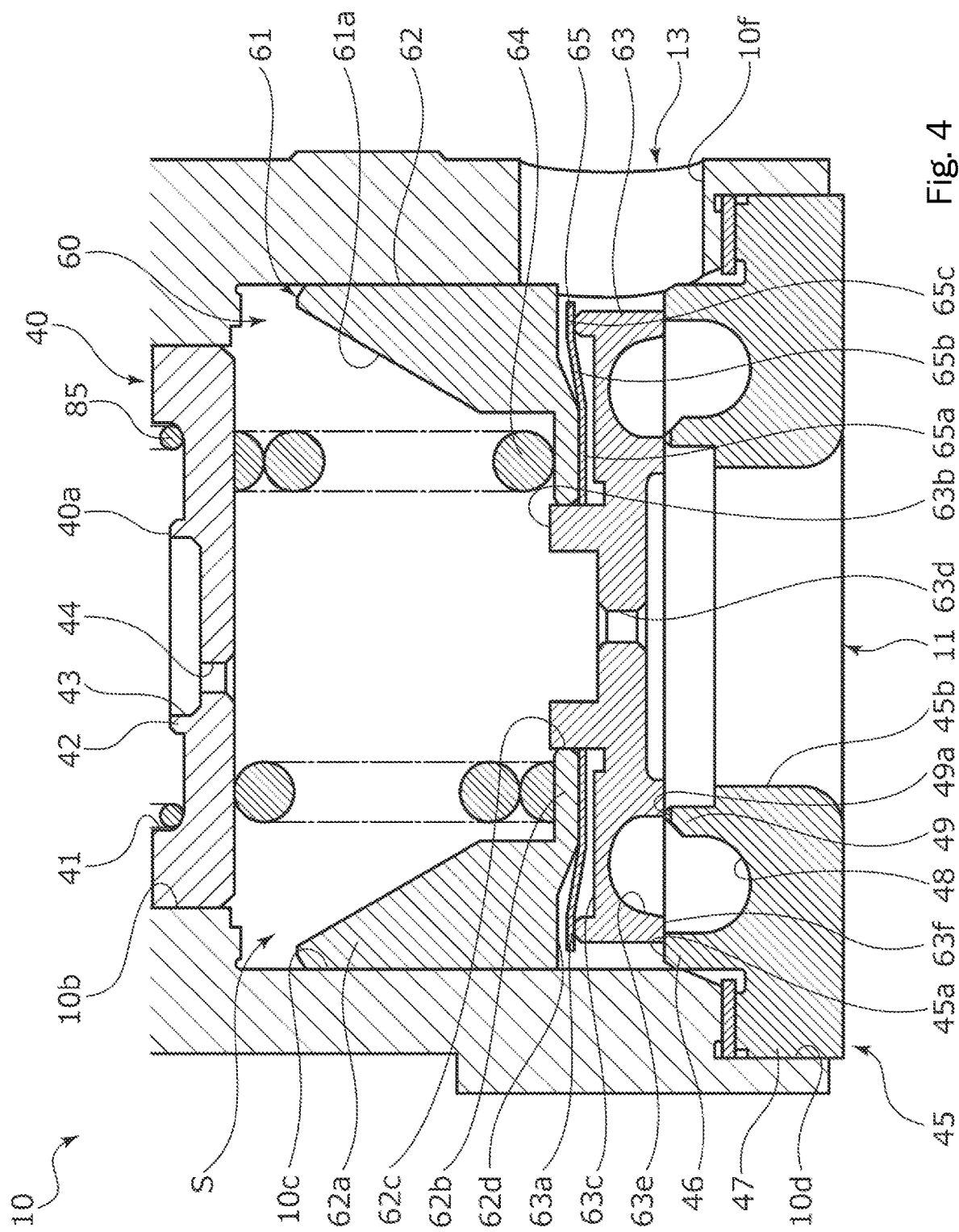
FIG. 4 is an enlarged cross-sectional view of a main valve in the fluid control valve in the first embodiment.

As illustrated in FIG. 4, the main valve body 61 mainly includes a piston 62 which is formed in a U-shaped cylindrical shape in a cross-sectional view and is a base portion and an opening and closing portion 63. That is, the main valve body 61 is divided into two parts in the axial direction by the piston 62 and the opening and closing portion 63.

The piston 62 includes a cylindrical portion 62a which is provided to extend in the axial direction and a bottom portion 62b which extends in the inner radial direction from the lower end portion of the cylindrical portion 62a and a through-hole 62c which penetrates in the axial direction is formed at the center of the bottom portion 62b.

Further, the coil spring 64 which is a first biasing member for biasing the piston 62 in the valve closing direction, that is, toward the axially lower side is disposed between the bottom portion 62b of the piston 62 and the pilot valve seat member 40 in a compressed state. Further, a leaf spring 65 which is a second biasing member for biasing the opening and closing portion 63 in the valve closing direction, that is, toward the axially lower side is disposed between the piston 62 and the opening and closing portion 63.

Further, the piston 62 is provided with a concave portion 61a which is defined by the inner peripheral surface of the cylindrical portion 62a and the upper end surface of the bottom portion 62b and is recessed in a funnel shape toward the axially lower side.

An annular concave portion 62d which is recessed toward the axially upper side is formed in the outer radial side lower end portion of the cylindrical portion 62a.

The opening and closing portion 63 includes an annular outer radial side convex portion 63a which protrudes from the outer radial end portion toward the axially upper side and an annular inner radial side convex portion 63b which protrudes from the radial center portion toward the axially upper side and an annular concave portion 63c is formed between the outer radial side convex portion 63a and the inner radial side convex portion 63b. The inner radial side convex portion 63b is inserted into the through-hole 62c of the piston 62.

In a state in which the inner radial side convex portion 63b of the opening and closing portion 63 is inserted into the through-hole 62c of the piston 62, the outer peripheral surface of the inner radial side convex portion 63b and the inner surface of the bottom portion 62b of the piston 62 are formed to be substantially parallel to each other. Therefore, the opening and closing portion 63 is movable in the axial direction while sliding on the piston 62.

The radial center portion of the opening and closing portion 63 is provided with a communication path 63d which penetrates in the axial direction. Additionally, the inside of the main valve body 61 communicates with the first flow path 11 through the communication path 63d of the opening and closing portion 63.

The outer radial side lower end portion of the opening and closing portion 63 is provided with an annular concave portion 63e which is recessed toward the axially upper side. A lower end portion 63f of the opening and closing portion 63 located on the outer radial side of the annular concave portion 63e is seated on the main valve seat 45a in the valve closed state of the main valve 60.

Figure 5:
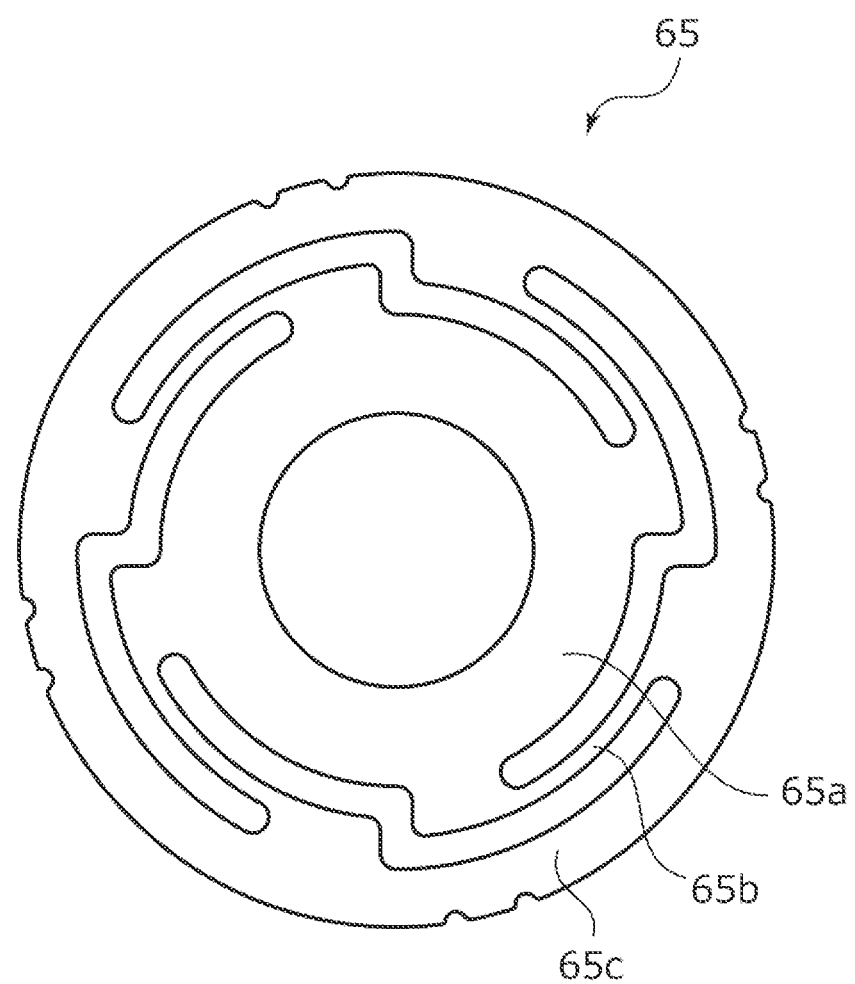
FIG. 5 is a plan view illustrating a second biasing member constituting the main valve in the first embodiment.

As illustrated in FIGS. 4 and 5, the leaf spring 65 is a spring which has a stepped circular ring and plate shape in cross-section and has a spring constant lower than that of the coil spring 64. Further, the leaf spring 65 mainly includes an annular inner radial plate portion 65a, a plurality of connection portions 65b which are bent upward from the outer radial end of the inner radial plate portion 65a and are bridged, and an annular outer radial plate portion 65c which is bent downward from the outer radial end of the connection portion 65b and is connected.

In the leaf spring 65, the inner radial plate portion 65a and the outer radial plate portion 65c are substantially parallel to each other. Accordingly, the leaf spring 65 is deformable by receiving the axial load so that the bending angle of the connection portion 65b becomes small, that is, the axial distance between the inner radial plate portion 65a and the outer radial plate portion 65c becomes small.

The leaf spring 65 is disposed so that the upper end surface of the inner radial plate portion 65a comes into contact with the lower end surface of the bottom portion 62b of the piston 62 and the lower end surface of the outer radial plate portion 65c comes into contact with the upper end surface of the outer radial side convex portion 63a of the opening and closing portion 63 in the valve closed state of the main valve 60. Further, the leaf spring 65 has a spring force smaller than that of the coil spring 64 when the main valve 60 is closed.

Returning to the configuration of the valve housing 10, the large-diameter bottomed cylindrical portion 10d is continuous to the medium-diameter bottomed cylindrical portion 10c and is recessed toward the axially upper side while the inside of the medium-diameter bottomed cylindrical portion 10c is enlarged in diameter.

The main valve seat member 45 that is press-inserted from the axially lower side is integrally fixed to the large-diameter bottomed cylindrical portion 10*d* in a substantially sealed state.

As illustrated in FIG. 4, the main valve seat member 45 is formed in a cylindrical shape having the first flow path 11 penetrating in the axial direction from a metal material or a resin material.

The main valve seat member 45 includes a cylindrical portion 46 which extends in the axial direction and an annular flange portion 47 which extends toward the outer radial side from the lower end portion of the cylindrical portion 46. Further, in the main valve seat member 45, the flange portion 47 is press-inserted and fixed in a sealed state to the large-diameter bottomed cylindrical portion 10*d* from the axially lower side through a gasket in a state in which the upper end portion of the cylindrical portion 46 is inserted into the lower end portion of the medium-diameter bottomed cylindrical portion 10*c*.

Further, the upper end portion of the cylindrical portion 46 is provided with an annular concave portion 48 which is recessed in a U shape in a cross-sectional view toward the axially lower side. A communication path 45*b* which penetrates in the axial direction and into which the working fluid flows from the absorber piston chamber P is formed on the inner radial side of the annular concave portion 48.

Further, an annular land 49 is formed between the annular concave portion 48 and the communication path 45*b* on the inner radial side of the cylindrical portion 46. A plurality of communication grooves 49*a* which extend in the radial direction and communicate the annular concave portion 48 and the communication path 45*b* with each other are formed in the upper end portion of the land 49. With this communication groove 49*a*, the working fluid can be introduced into the annular concave portion 48 and the annular concave portion 63*e* of the opening and closing portion 63 even in the valve closed state of the main valve 60.

The communication path 45*b* of the main valve seat member 45, the annular concave portion 48, and the communication groove 49*a* constitute the upstream flow path of the main valve 60, that is, the first flow path 11 together with the lower end portion of the opening and closing portion 63.

Returning to FIG. 1, a communication groove 10*e* which has a downward L-shape in a cross-sectional view from the upper end to the side surface of the cylindrical portion 10*a* is formed on the outer surface of the valve housing 10. Specifically, the communication groove 10*e* extends toward the outer radial direction along the upper end surface of the valve housing 10 and then extends toward the axially lower side in a substantially orthogonal direction along the outer peripheral surface of the valve housing 10.

Further, the lower side end portion of the communication groove 10*e* extends downward in relation to the lower end of the opening portion 81*b* in a state in which the valve housing 10 is fitted to the opening portion 81*b* of the casing 81 and the working fluid can flow from the lower end of the communication groove 10*e* to the reservoir chamber R.

Accordingly, the communication groove 10*e* constitutes a pilot downstream flow path 12 of the pilot valve 50.

More specifically, the pilot downstream flow path 12 is formed by the cylindrical portion 10*a*, the small-diameter bottomed cylindrical portion 10*b*, and the communication groove 10*e* of the valve housing 10, the upper end portion on the outer radial side of the annular convex portion 42 in the pilot valve seat member 40, the opening portion 81*b* of the casing 81, and the opening portion 82*b* of the center post 82.

Further, as illustrated in FIG. 4, the valve housing 10 is provided with a communication path 10*f* which extends from the medium-diameter bottomed cylindrical portion 10*c* toward the outer radial side and communicates the inside of the medium-diameter bottomed cylindrical portion 10*c* with the reservoir chamber R and the working fluid can flow from the communication path 10*f* into the reservoir chamber R.

Accordingly, the communication path 10*f* constitutes the downstream flow path of the main valve 60, that is, the second flow path 13.

More specifically, the second flow path 13 is formed by the medium-diameter bottomed cylindrical portion 10*c*, the large-diameter bottomed cylindrical portion 10*d*, and the communication path 10*f* of the valve housing 10, the main valve body 61, and the main valve seat member 45.

Next, the operation of the fluid control valve V, mainly the opening and closing operations of the pilot valve 50 and the main valve 60 will be described with reference to FIGS. 1 to 7.

First, the fluid control valve V in the non-energized state will be described. Referring to FIGS. 1 and 2, when the pilot valve 50 is not energized, the pilot valve body 51 is pressed toward the axially upper side by the biasing force of the coil spring 85. Accordingly, the sealing body 54 (see FIG. 2) of the pilot valve body 51 is separated from the pilot valve seat 40*a* and the pilot valve 50 is opened. The pilot valve opening degree at this embodiment becomes maximal in this embodiment.

In a non-energized state, when the shock absorber A is operated so that the pressure of the working fluid in the first flow path 11 becomes high, the working fluid passes through the communication path 63*d* (see FIG. 4) of the opening and closing portion 63 and the pilot control chamber S and flows from the pilot downstream flow path 12 into the reservoir chamber R. Also, as will be described later, the working fluid may also flow into the reservoir chamber R from the second flow path 13 depending on the pressure of the working fluid.

In the fluid control valve V, the flow path cross-sectional area of the communication path 63*d* of the opening and closing portion 63 is formed to be narrow. Therefore, even when the pressure of the working fluid of the first flow path 11 is high, it is difficult for the pressure of the working fluid of the pilot control chamber S to increase in response to the pressure of the working fluid in the first flow path 11. Thus, a differential pressure is generated between the pressure of the working fluid of the first flow path 11 and the pressure of the working fluid in the pilot control chamber S. As the differential pressure increases, the main valve 60 is likely to be open.

Based on this, in this embodiment, with respect to the pressure of the working fluid in the pilot control chamber S, the pressure of the working fluid in the first flow path 11 sufficient to deform only the leaf spring 65 is assumed to be pressure P1 and the pressure of the working fluid in the first flow path 11 sufficient to deform the leaf spring 65 and the coil spring 64 is assumed to be the pressure P2. Here, the pressure P1 becomes lower than the pressure P2 (P1<P2). Additionally, in the following description, the pressure of the working fluid of the first flow path 11 is described as the "pressure Pin of the first flow path 11" and the pressure of the working fluid of the pilot control chamber S is described as the "pressure Ps of the pilot control chamber S".

When the differential pressure $\Delta P$ (=Pin−Ps) between the pressure Pin of the first flow path 11 and the pressure Ps of the pilot control chamber S becomes small after the main valve 60 is opened, the main valve 60 is closed.

The reason why the differential pressure ΔP becomes small is a decrease in the pressure Pin of the first flow path 11 when the working fluid passes through the main valve 60 and flows from the second flow path 13 into the reservoir chamber R, a decrease in the pressure Pin of the first flow path 11 when the working fluid flows from the communication path 63*d* into the pilot control chamber S, or an increase in the pressure Ps of the pilot control chamber S when the volume of the pilot control chamber S becomes narrow due to the movement of the main valve body 61. Hereinafter, the opening and closing operation of the main valve 60 will be described in more detail with specific examples.

Figure 6:
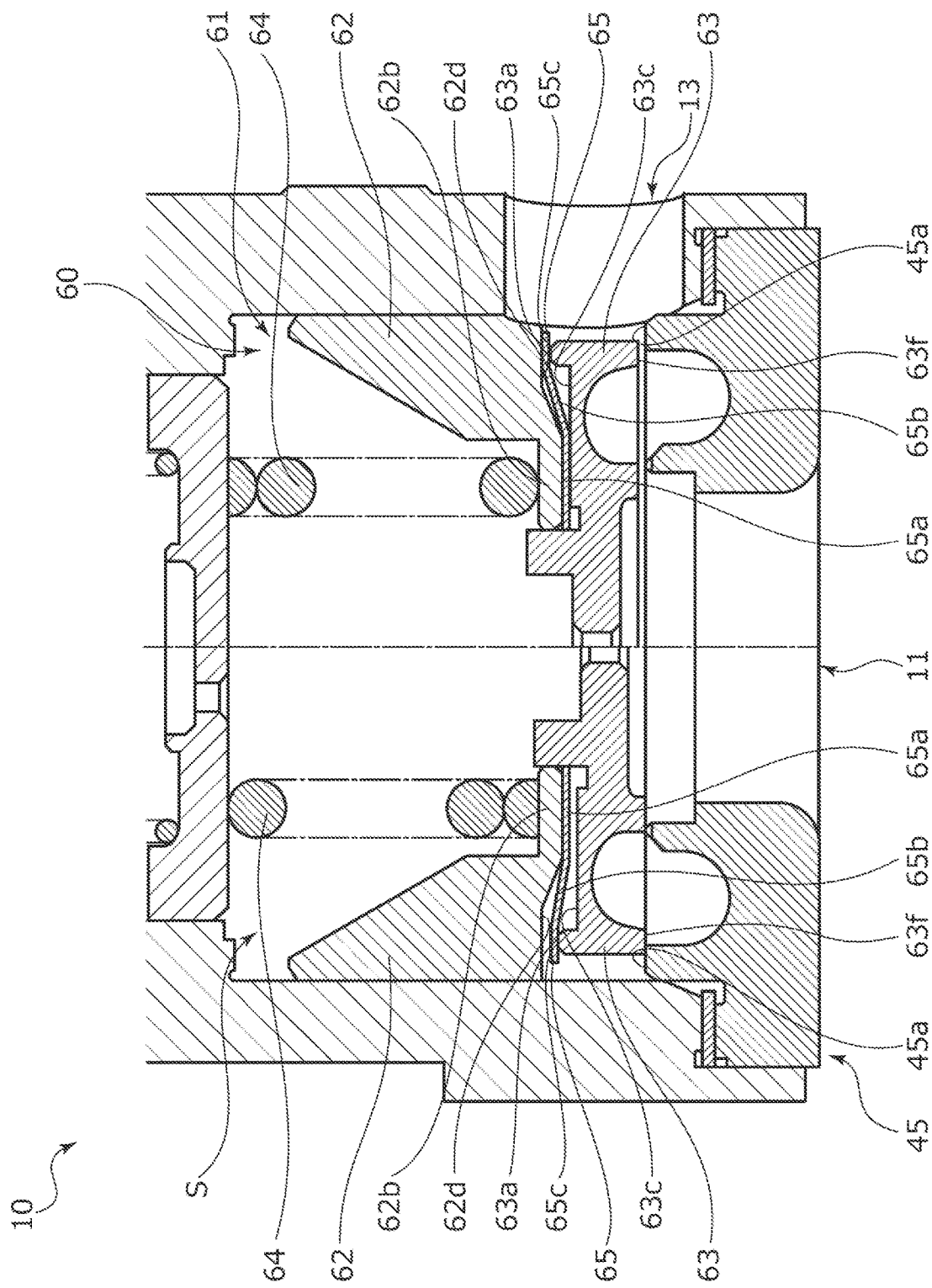
FIG. 6 is a cross-sectional view sequentially illustrating a state in which the main valve is closed in the fluid control valve in the first embodiment and a state in which the main valve is opened by compressing a second biasing member.

Referring to FIGS. 1 and 6, for example, when the pressure Pin of the first flow path 11 is smaller than the pressure P1 (Pin<P1), such as when the absorber piston in the shock absorber A reciprocates with a minute stroke while traveling on a smooth road surface, in the main valve body 61, the lower end portion 63*f* of the opening and closing portion 63 is seated on the main valve seat 45*a* and the main valve 60 is closed due to the biasing force of the coil spring 64 and the leaf spring 65.

Referring to the left half of FIG. 6, in the valve closed state of the main valve 60, a force in which the coil spring 64 biases the piston 62 downward becomes larger than a force in which the leaf spring 65 biases the piston 62 upward. Accordingly, the leaf spring 65 is bent and deformed in the compression direction such that the inner radial plate portion 65*a* on the inner radial side is pushed toward the axially lower side by the coil spring 64 and the outer radial plate portion 65*c* on the outer radial side is supported in a contact state from the lower side of the outer radial side convex portion 63*a* of the opening and closing portion 63. At this time, the inner radial plate portion 65*a* of the leaf spring 65 and the bottom surface of the annular concave portion 63*c* of the opening and closing portion 63, and the outer radial plate portion 65*c* of the leaf spring 65 and the bottom surface of the concave portion 62*d* of the piston 62 are respectively separated from each other in the axial direction, so that the allowance for moving the opening and closing portion 63 in the axial direction is obtained.

Referring to FIGS. 1 and 6, for example, when the pressure Pin of the first flow path 11 is equal to or higher than the pressure P1 and lower than the pressure P2 (P2>Pin≥P1), such as when the absorber piston in the shock absorber A reciprocates repeatedly with small strokes when traveling on an uneven road surface, only the opening and closing portion 63 moves toward the axially upper side against the biasing force of the leaf spring 65.

That is, the lower end portion 63*f* of the opening and closing portion 63 is slightly separated from the main valve seat 45*a* and the main valve 60 is opened. Accordingly, the working fluid flows from the second flow path 13 to the reservoir chamber R through the main valve 60 (see the right half in FIG. 6).

At this time, the working fluid that becomes surplus in the pilot control chamber S flows into the reservoir chamber R from the pilot downstream flow path 12 as only the opening and closing portion 63 moves.

In addition, since the main valve 60 is closed as the differential pressure ΔP decreases as described above, the valve opening degree of the main valve 60 becomes larger as the pressure Pin of the first flow path 11 becomes closer to the pressure P2.

Further, when the opening and closing portion 63 moves against the biasing force of the leaf spring 65, the lower end surface of the inner radial plate portion 65*a* of the leaf spring 65 comes into press-contact with the bottom surface of the annular concave portion 63*c* and the upper end surface of the outer radial plate portion 65*c* of the leaf spring 65 approaches or contacts the bottom surface of the concave portion 62*d* of the piston 62. Accordingly, since the upper end surface of the outer radial plate portion 65*c* of the leaf spring 65 comes into contact with the bottom surface of the concave portion 62*d* of the piston 62 when the pressure Pin of the working fluid in the first flow path 11 is the pressure P2, the pressure applied from the working fluid of the first flow path 11 is likely to be applied to the piston 62 through the opening and closing portion 63.

Figure 7:
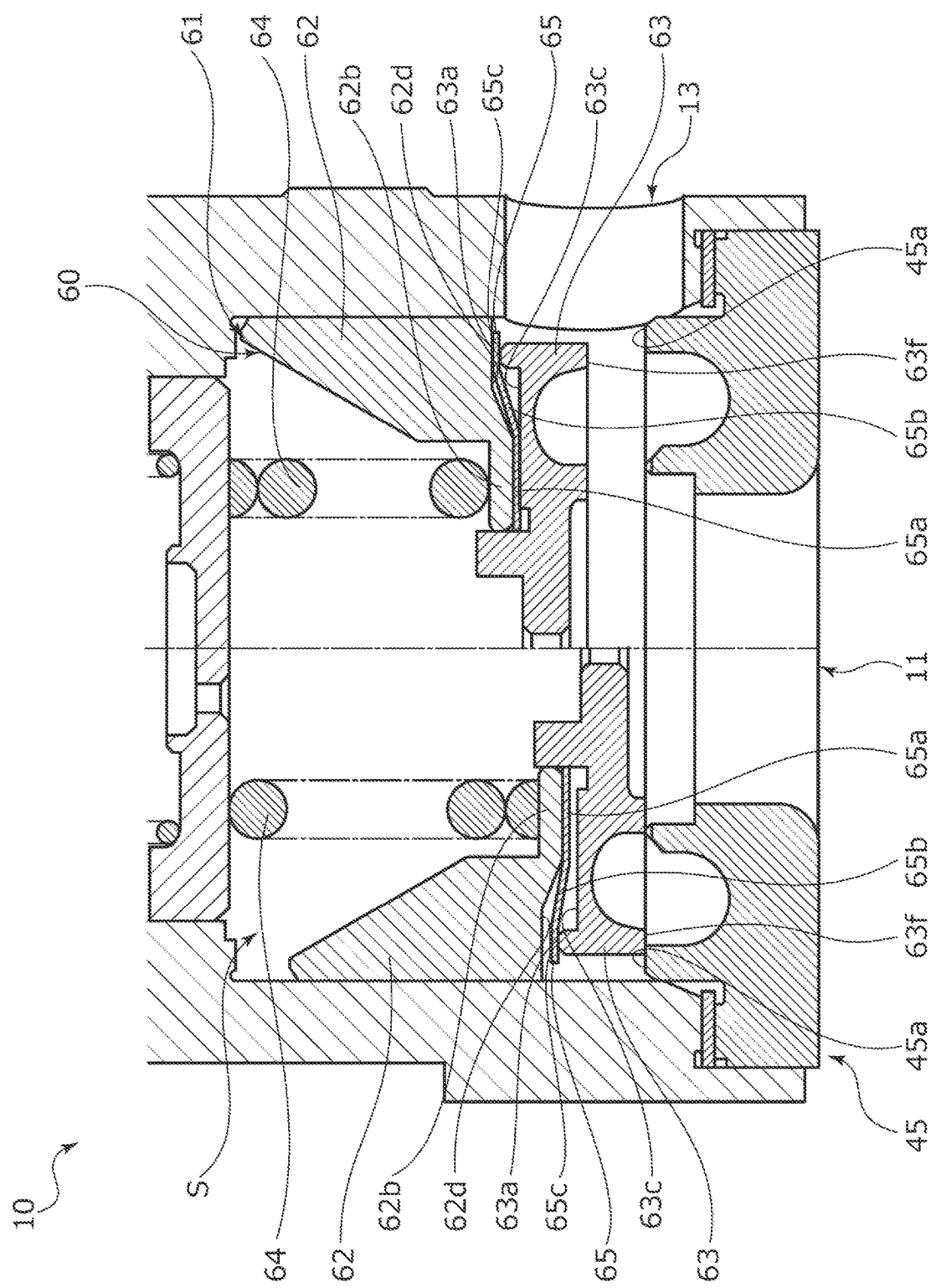
FIG. 7 is a cross-sectional view sequentially illustrating a state in which the main valve is closed in the fluid control valve in the first embodiment and a state in which the main valve is opened by compressing a first biasing member and a second biasing member.

Referring to FIGS. 1 and 7, for example, when the pressure Pin of the first flow path 11 is equal to or higher than the pressure P2 (Pin P2), such as when the absorber piston in shock absorber A tries to make a large stroke in order to overcome a step on the road surface, not only the opening and closing portion 63 but also the piston 62 move toward the axially upper side against the biasing force of the coil spring 64 and the leaf spring 65.

That is, the lower end portion 63*f* of the opening and closing portion 63 is further separated from the main valve seat 45*a* and the main valve 60 is opened. Accordingly, the working fluid flows from the second flow path 13 to the reservoir chamber R through the main valve 60.

In addition, the valve opening degree of the main valve 60 when the pressure Pin of the first flow path 11 is equal to or higher than the pressure P2 (Pin P2) becomes maximal in this embodiment (see the right half of FIG. 7).

Further, the working fluid that becomes surplus in the pilot control chamber S flows from the pilot downstream flow path 12 to the reservoir chamber R as the opening and closing portion 63 moves.

In this way, the fluid control valve V can release the working fluid to the reservoir chamber R by opening the main valve 60 in approximately two stages according to the increase in the pressure Pin in the first flow path 11.

Further, since the main valve 60 is easily opened when the pilot valve opening degree of the pilot valve 50 becomes maximal in the non-energized state, the damping force of the shock absorber A is controlled to be minimum.

Then, the working fluid flows from the second flow path 13 to the reservoir chamber R through the main valve 60. As the pressure Pin of the first flow path 11 decreases, the coil spring 64 extends and the valve opening degree decreases. As described above, when the pressure Pin of the first flow path 11 is equal to or higher than the pressure P1 and lower than the pressure P2 (P2>Pin≥P1), only the opening and closing portion 63 moves toward the axially upper side against the biasing force of the leaf spring 65 (see the right half of FIG. 6).

Further, when the working fluid flows from the second flow path 13 to the reservoir chamber R through the main valve 60 so that the pressure Pin of the first flow path 11 becomes smaller than the pressure P1 (Pin<P1), the leaf spring 65 extends, the lower end portion 63*f* of the opening and closing portion 63 is seated on the main valve seat 45*a*, and the main valve 60 is closed.

Next, the control of the damping force by the pilot valve 50 will be mainly described for the fluid control valve V in the energized state. Additionally, since the main valve 60 is operated in the energized state in substantially the same manner as in the non-energized state, the description thereof will be omitted.

Referring to FIGS. 1 and 3, when the electromagnetic force generated by applying a current to the solenoid 80 exceeds the biasing force of the coil spring 85 in the energized state (that is, during so-called duty control), the movable iron core 84 is drawn toward the center post 82, that is, toward the axially lower side.

Accordingly, the rod 83 fixed to the movable iron core 84 moves toward the axially lower side together with the pilot valve body 51. In response to this, the pilot valve 50 is closed when the pilot valve opening degree decreases and a current exceeding a predetermined level is applied.

When the pilot valve is opened with a small opening compared to the non-energized state, the working fluid of the first flow path 11 flows from the pilot downstream flow path 12 to the reservoir chamber R in accordance with the operation of the shock absorber A as in the non-energized state. Further, as described above, the working fluid also flows from the second flow path 13 to the reservoir chamber R depending on the pressure Pin of the first flow path 11.

Then, as the pilot valve opening degree decreases, the working fluid is less likely to flow from the pilot control chamber S to the pilot downstream flow path 12. Therefore, the differential pressure ΔP is less likely to occur between the pressure Pin of the first flow path 11 and the pressure Ps of the pilot control chamber S and the main valve 60 is less likely to be opened. That is, the damping force of the shock absorber A can be increased.

In other words, when the pilot valve opening degree is maximal, the damping force of the shock absorber A becomes minimal. That is, the damping force is controlled to be the smallest when the fluid control valve V is in the non-energized state.

Further, even when the main valve 60 is opened, the differential pressure ΔP becomes smaller in a short time as the pilot valve opening degree of the pilot valve 50 becomes smaller. That is, the opening time of the main valve 60 is shortened as the pilot valve opening degree of the pilot valve 50 becomes smaller.

For these reasons, the fluid control characteristics of the main valve 60 are controlled according to the pilot valve opening degree of the pilot valve 50. Accordingly, the fluid control valve V can variably control the damping force of the shock absorber A.

If a high pressure Pin is generated in the first flow path 11 even when a predetermined current or more is applied and the pilot valve 50 is closed, the pilot valve 50 is slightly opened due to this working fluid. Accordingly, the working fluid flows from the pilot downstream flow path 12 to the reservoir chamber R as in the non-energized state.

In this way, when the pilot valve 50 is closed in the energized state, the fluid control valve V is in a state in which it is most difficult for the working fluid to pass through the pilot valve 50 and in a state in which it is difficult to open the main valve 60. Therefore, the fluid control valve V can maximize the damping force in the shock absorber A.

In addition, a current value to be applied to the coil 86 that constitutes the solenoid 80 is set based on input parameters such as a vehicle speed, a vehicle acceleration/deceleration, a steering angle, a road surface condition, and a spring load.

Further, the pilot valve 50 in the open state may be closed by setting a current value equal to or higher than a predetermined value.

Second Embodiment

Next, a fluid control valve according to a second embodiment of the present invention will be described with reference to FIG. 8. Additionally, descriptions of configurations that are the same as those of the first embodiment will be omitted.

Figure 8:
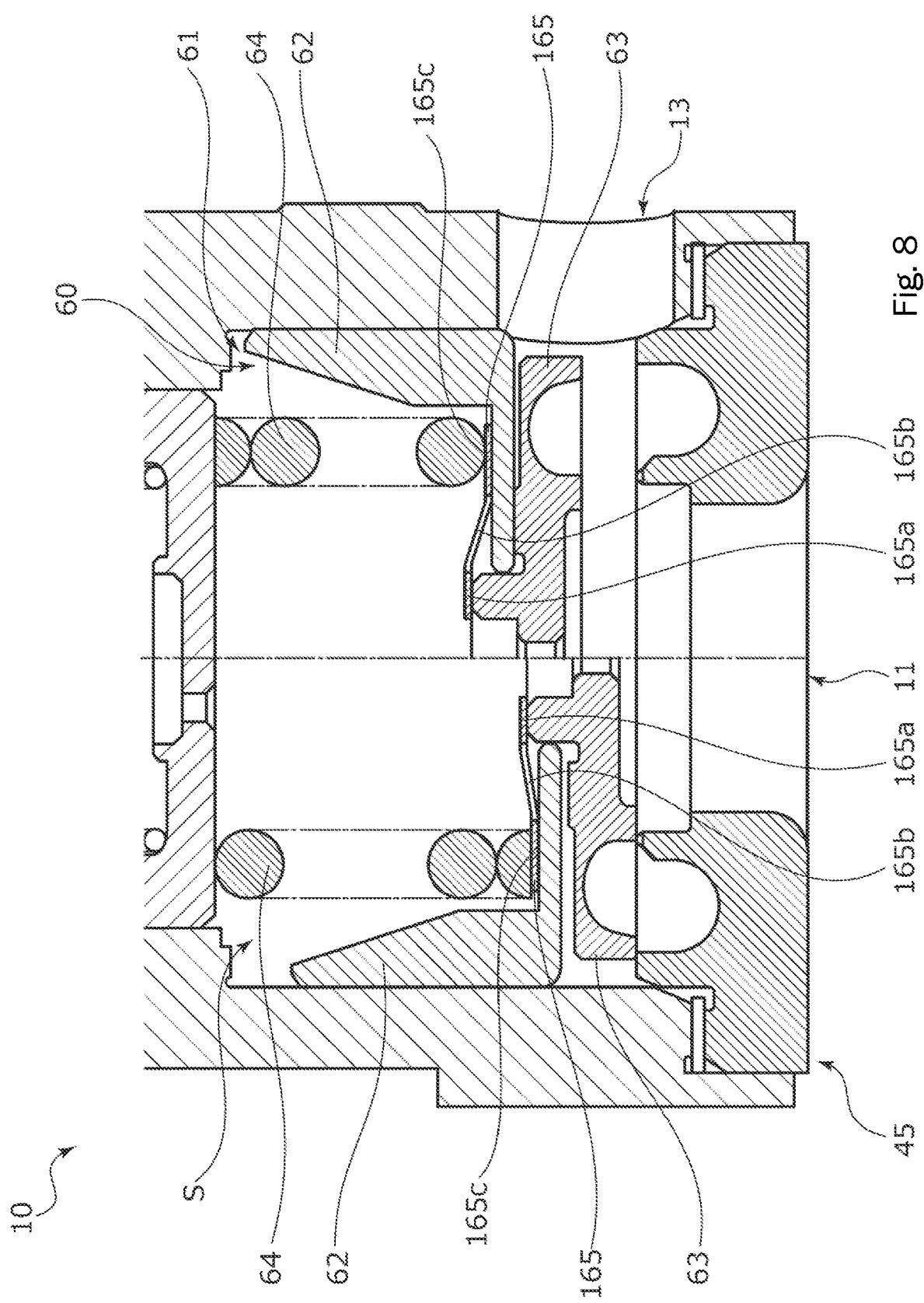
FIG. 8 is a cross-sectional view illustrating a main part of a fluid control valve according to a second embodiment of the present invention.

As illustrated in FIG. 8, a leaf spring 165 of the fluid control valve according to the second embodiment of the present invention is a spring which has a stepped circular ring and plate shape in cross-section and has a spring constant lower than that of the coil spring 64. Further, the leaf spring 165 mainly includes an annular inner radial plate portion 165a, a plurality of connection portions 165b which are bent downward from the outer radial end of the inner radial plate portion 165a and are bridged, and an annular outer radial plate portion 165c which is bent upward from the outer radial end of the connection portion 165b and is connected.

In the leaf spring 165, the inner radial plate portion 165a and the outer radial plate portion 165c are substantially parallel to each other. Accordingly, the leaf spring 165 is deformable by receiving the axial load so that the bending angle of the connection portion 165b becomes large, that is, the axial distance between the inner radial plate portion 165a and the outer radial plate portion 165c becomes large.

In the leaf spring 165, the outer radial plate portion 165c is provided between the coil spring 64 and the piston 62.

Further, the leaf spring 165 is disposed so that the lower end surface of the inner radial plate portion 165a comes into contact with the upper end surface of the inner radial side convex portion 63b of the opening and closing portion 63 and it receives the axial load from the coil spring 64. Further, in the leaf spring 165, also in the valve closed state (see the left half of FIG. 8) and the valve open state (see the left half of FIG. 8) of the main valve 60, a force in which the inner radial plate portion 165a of the leaf spring 165 biases the piston 62 upward becomes smaller than a force in which the coil spring 64 biases the inner radial plate portion 165a of the leaf spring 165 downward. That is, the spring force of the leaf spring 165 becomes smaller than the spring force of the coil spring 64.

Accordingly, in the valve closed state of the main valve 60, the leaf spring 165 is bent and deformed in the extension direction such that the inner radial plate portion 165a on the inner radial side is pressed toward the axially upper side by the upper end surface of the inner radial side convex portion 63b of the opening and closing portion 63 (see the left half of FIG. 8). At this time, the opening and closing portion 63 and the piston 62 are separated from each other in the axial direction, so that the allowance for moving the opening and closing portion 63 in the axial direction is obtained.

Further, in the main valve 60, when the pressure Pin of the first flow path 11 is equal to or higher than the pressure P1 and lower than the pressure P2 (P2>Pin≥P1), only the opening and closing portion 63 moves toward the axially upper side against the biasing force of the leaf spring 165.

That is, the lower end portion 63f of the opening and closing portion 63 is slightly separated from the main valve seat 45a and the main valve 60 is opened. Accordingly, the working fluid flows from the second flow path 13 to the reservoir chamber R through the main valve 60. At this time, the leaf spring 165 is bent and deformed in the extension direction as the opening and closing portion 63 approaches the piston 62.

Further, referring to the right half of FIG. 8, when the opening and closing portion 63 moves against the leaf spring 165, the opening and closing portion 63 approaches or contacts the piston 62. Accordingly, since the opening and closing portion 63 comes into contact with the piston 62 when the pressure Pin of the first flow path 11 is large, the pressure applied from the working fluid of the first flow path 11 is likely to be applied to the piston 62 through the opening and closing portion 63.

Then, when the pressure Pin of the first flow path 11 becomes smaller than the pressure P1 (Pin<P1), the leaf spring 165 extends, the lower end portion 63f of the opening and closing portion 63 is seated on the main valve seat 45a, and the main valve 60 is closed.

As described above, in the fluid control valve V of the embodiment, when the pressure Pin of the first flow path 11 becomes high, the opening and closing portion 63 moves against the leaf spring 65 having a small spring force, prior to the piston 62 and the coil spring 64. Therefore, when the pressure of the first flow path 11 is low, the opening and closing portion 63 can move without accompanying the movement of the piston 62 or the coil spring 64 as illustrated in FIG. 6. Accordingly, the highly responsive fluid control valve V can be provided.

Further, when the pressure of the working fluid of the first flow path 11 is high, as illustrated in FIG. 7, the piston 62 is further pressed by the leaf spring 65 and the opening and closing portion 63 from a state in which the opening and closing portion 63 moves against the leaf spring 65, and the piston 62, the leaf spring 65, and the opening and closing portion 63 move against the coil spring 64. Accordingly, the highly responsive fluid control valve V can be provided.

Further, as illustrated in FIG. 4, since the flow path cross-sectional area between the through-hole 62c of the piston 62 and the inner radial side convex portion 63b of the opening and closing portion 63 can be narrower than the flow path cross-sectional area of the communication groove 49a of the land 49, it is possible to improve the responsiveness when the opening and closing portion 63 moves against the leaf spring 65 when the pressure of the first flow path 11 is high.

Further, since the piston 62 is slidable on the inner peripheral surface of the medium-diameter bottomed cylindrical portion 10c of the valve housing 10 to guide the movement thereof when moving in the axial direction, the operation of the main valve body 61 can be stabilized.

Further, since the inner radial side convex portion 63b of the opening and closing portion 63 is slidable on the inner peripheral surface of the bottom portion 62b of the piston 62 and the opening and closing portion 63 is moved while being guided relatively coaxially with the piston 62, the valve opening degree of the main valve 60 can be highly accurately controlled.

Further, since the outer diameter of the opening and closing portion 63 is smaller than the inner diameter of the medium-diameter bottomed cylindrical portion 10c of the valve housing 10 and the outer peripheral surface is separated from the inner peripheral surface of the medium-diameter bottomed cylindrical portion 10c, the responsiveness can be improved compared to a configuration in which the same outer peripheral surface is disposed to be slidable on the inner peripheral surface of the medium-diameter bottomed cylindrical portion 10c.

Further, since the leaf spring 65 is applied as the second biasing member, for example, the axial dimension of the main valve 60 can be shortened compared to a configuration in which a coil spring is applied.

Further, since the pressure of the pilot control chamber S can be changed by changing the flow rate of the working fluid flowing through the pilot control chamber S, the fluid control characteristics of the main valve 60 can be changed while maintaining high responsiveness.

Further, since the leaf spring 65 is disposed outside the pilot control chamber S through which the working fluid passes and is not exposed to the pilot control chamber S, deterioration of the leaf spring 65 and contamination caused by the leaf spring 65 can be prevented.

Although the embodiments of the present invention have been described above with reference to the drawings, the specific configuration is not limited to these examples, and any changes or additions that do not depart from the scope of the present invention are included in the present invention.

For example, in the above-described embodiments, the main valve body has been described as a configuration divided into two parts of the piston and the opening and closing portion, but the present invention is not limited thereto. For example, the base portion may be divided into two parts or more such that the base portion is divided into three parts or more including the base portion and the opening and closing portion. For example, the main valve may be openable in approximately three stages in such a manner that a rigid base portion is divided into two parts in the axial direction and a third biasing member having a spring force different from those of the first biasing member and the second biasing member is interposed between the upper base portion and the lower base portion.

Further, the valve seat has been described as one formed in the valve seat member separated from the valve housing, but the present invention is not limited thereto. For example, the valve seat may be integrally formed with the valve housing.

Further, the base portion has been described by exemplifying the piston sliding on the inner peripheral surface of the valve housing, but the present invention is not limited thereto. For example, the base portion may be separated from the inner peripheral surface of the valve housing and may be movable in the axial direction. That is, the base portion may be a configuration other than the piston.

Further, the opening and closing portion has been described as a structure that slides on the inner surface of the bottom of the piston, but the present invention is not limited thereto. If a separate movement guiding means is provided such that the opening and closing portion slides on the inner peripheral surface of the valve housing, the opening and closing portion may not be provided to be slidable on the base portion.

Further, the second biasing member has been described as the leaf spring, but the present invention is not limited thereto. For example, the second biasing member may be changed to a coil spring, disc spring, or the like as appropriate.

REFERENCE SIGNS LIST

10 Valve housing
11 First flow path
12 Pilot downstream flow path
13 Second flow path
40a Pilot valve seat
45a Main valve seat (valve seat)
50 Pilot valve
51 Pilot valve body
60 Main valve
61 Main valve body (valve body)
62 Piston (base portion)
63 Opening and closing portion
63d Communication path
64 Coil spring (first biasing member)
65 Leaf spring (second biasing member)
80 Solenoid
A Shock absorber P Absorber piston chamber
R Reservoir chamber
S Pilot control chamber
V Fluid control valve

The invention claimed is:

1. A fluid control valve, comprising:
a valve seat;
a valve body configured to contact and separate from the valve seat;
a first spring configured to bias the valve body in a valve closing direction; and
a second spring having a spring force lower than that of the first spring and configured to bias the valve body in the valve closing direction,
the valve seat and the valve body being provided between a first flow path and a second flow path and the fluid control valve being configured to discharge a working fluid of the first flow path is discharged to the second flow path depending on a pressure of the working fluid of the first flow path, and
wherein the valve body is axially divided into a base portion biased by the first spring and an opening and closing portion configured to contact and separate from the valve seat,
the second spring is disposed so that the base portion and the opening and closing portion are axially separable from each other,
a space inside a valve housing in which the base portion and the first spring are housed is a pilot control chamber, and
the opening and closing portion is provided with a communication path which communicates the first flow path with the pilot control chamber.

2. The fluid control valve according to claim 1,
wherein the base portion is axially slidable with respect to a valve housing in which the base portion is housed.

3. The fluid control valve according to claim 2,
wherein the opening and closing portion is axially slidable with respect to the base portion.

4. The fluid control valve according to claim 1, wherein the second spring is disposed between the base portion and the opening and closing portion and outside the pilot control chamber.

5. A fluid control valve, comprising:
a valve seat;
a valve body configured to contact and separate from the valve seat;
a first spring configured to bias the valve body in a valve closing direction; and
a second spring having a spring force lower than that of the first spring and configured to bias the valve body in the valve closing direction,
the valve seat and the valve body being provided between a first flow path and a second flow path and the fluid control valve being configured to discharge a working fluid of the first flow path is discharged to the second flow path depending on a pressure of the working fluid of the first flow path, and
wherein the valve body is axially divided into a base portion biased by the first spring and an opening and closing portion configured to contact and separate from the valve seat,
the second spring is disposed so that the base portion and the opening and closing portion are axially separable from each other,
the fluid control valve further comprises a pilot valve seat member which provided with a pilot valve seat, and a pilot valve body which is configured to contact and separate from the pilot valve seat, and
the first spring is disposed between the base portion of the valve body and the pilot valve seat member and configured to bias the base portion and the pilot valve seat member in directions in which the base portion and the pilot valve seat member are separated from each other.

6. The fluid control valve according to claim 5,
wherein the base portion is axially slidable with respect to a valve housing in which the base portion is housed.

7. The fluid control valve according to claim 6,
wherein the opening and closing portion is axially slidable with respect to the base portion.

8. The fluid control valve according to claim 5,
wherein a space inside a valve housing in which the base portion and the first spring are housed is a pilot control chamber, and
the opening and closing portion is provided with a communication path which communicates the first flow path with the pilot control chamber.

9. The fluid control valve according to claim 8,
wherein the second spring is disposed between the base portion and the opening and closing portion and outside the pilot control chamber.

10. The fluid control valve according to claim 5, comprising a third spring disposed between the pilot valve seat member and the pilot valve body and configured to bias the pilot valve seat member and the pilot valve body in a direction in which the pilot valve seat member and the pilot vale body is separated from each other.

11. The fluid control valve according to claim 10,
wherein a space inside a valve housing in which the base portion and the first spring are housed is a pilot control chamber,
a space inside a valve housing in which the pilot valve body and the third spring are housed is a pilot valve body chamber, and
the pilot valve seat member is provided with a communication path which communicates the pilot control chamber and the pilot valve body chamber.

* * * * *